United States Patent
Ohannessian, Jr. et al.

(10) Patent No.: US 9,612,836 B2
(45) Date of Patent: Apr. 4, 2017

(54) SYSTEM, METHOD, AND COMPUTER PROGRAM PRODUCT FOR IMPLEMENTING SOFTWARE-BASED SCOREBOARDING

(71) Applicant: NVIDIA Corporation, Santa Clara, CA (US)

(72) Inventors: Robert Ohannessian, Jr., Austin, TX (US); Michael Alan Fetterman, Boxborough, MA (US); Olivier Giroux, Santa Clara, CA (US); Jack H. Choquette, Palo Alto, CA (US); Xiaogang Qiu, San Jose, CA (US); Shirish Gadre, Fremont, CA (US); Meenaradchagan Vishnu, San Jose, CA (US)

(73) Assignee: NVIDIA Corporation, Santa Clara, CA (US)

(*) Notice: Subject to any disclaimer, the term of this patent is extended or adjusted under 35 U.S.C. 154(b) by 486 days.

(21) Appl. No.: 14/171,671

(22) Filed: Feb. 3, 2014

(65) Prior Publication Data
US 2015/0220341 A1 Aug. 6, 2015

(51) Int. Cl.
*G06F 9/00* (2006.01)
*G06F 9/30* (2006.01)
*G06F 9/52* (2006.01)
*G06F 9/38* (2006.01)

(52) U.S. Cl.
CPC ...... *G06F 9/30145* (2013.01); *G06F 9/30098* (2013.01); *G06F 9/3851* (2013.01); *G06F 9/522* (2013.01)

(58) Field of Classification Search
CPC .............................. G06F 9/3851; G06F 9/522
See application file for complete search history.

(56) References Cited

U.S. PATENT DOCUMENTS

2011/0078417 A1* 3/2011 Fahs ................... G06F 9/30145
712/216

* cited by examiner

*Primary Examiner* — Zachary K Huson
(74) *Attorney, Agent, or Firm* — Zilka-Kotab, PC (57) ABSTRACT

A system, method, and computer program product are provided for implementing a software-based scoreboarding mechanism. The method includes the steps of receiving a dependency barrier instruction that includes an immediate value and an identifier corresponding to a first register and, based on a comparison of the immediate value to the value stored in the first register, dispatching a subsequent instruction to at least a first processing unit of two or more processing units.

19 Claims, 9 Drawing Sheets

```
Psuedocode 500

TEX     R1, R2, R3, Rz    &wr=0x1;
TEX     R4, R5, R6, Rz    &wr=0x1;
TEX     R7, R8, R9, Rz    &wr=0x1;
DEPBAR  SB1, 2
FMUL    R1, R1, R10
DEPBAR  SB1, 1
FMUL    R4, R4, R11
DEPBAR  SB1, 0
FMUL    R7, R7, R12
EXIT;
```

Fig. 7

SYSTEM, METHOD, AND COMPUTER PROGRAM PRODUCT FOR IMPLEMENTING SOFTWARE-BASED SCOREBOARDING

FIELD OF THE INVENTION

The present invention relates to processor architectures, and more particularly to mechanisms to handle register dependencies.

BACKGROUND

Processors are designed to execute instructions and store results in registers, the results possibly being utilized as operands for subsequent instructions. Parallel processing architectures such as today's graphics processing units (GPUs) include a large number of parallel execution units configured to execute a large number of threads in parallel. The GPUs may also implement pipelined execution units that enable multiple, long-latency operations to be in flight at the same time. Many processors execute instructions in-order relative to the order of the instructions defined by the program. However, some processors allow for out-of-order execution of instructions. Due to the possibility that some instructions may depend on previously executed instructions and that strict ordering of instruction execution may not be adhered to by the processor, processors may be required to implement some form of scheduling mechanism to ensure that register dependencies are managed properly. Thus, there is a need for addressing this issue and/or other issues associated with the prior art.

SUMMARY

A system, method, and computer program product are provided for implementing a software-based scoreboarding mechanism. The method includes the steps of receiving a dependency barrier instruction that includes an immediate value and an identifier corresponding to a first register and, based on a comparison of the immediate value to the value stored in the first register, dispatching a subsequent instruction to at least a first processing unit of two or more processing units.

DETAILED DESCRIPTION

Conventional processing units execute a series of instructions in-order. The order in which the instructions are executed matches the order of the instructions in the program. More recently, some processing units enable out-of-order execution, where some instructions are executed in a different order than the order of the instructions in the program. To enable the management of dependencies between instructions, various techniques may be implemented in the architecture of the processing unit.

One such technique is to utilize a scoreboarding mechanism. One way to implement a scoreboarding mechanism is to increment a counter in response to a specific event and decrement the counter in response to a related event. The value of the counter can then be analyzed to indicate what events have occurred at a particular point in time. For example, a counter may be incremented when an instruction is dispatched and decremented when a result for the instruction has been written to a destination register. Consequently, an instruction that depends on the result of a previously issued instruction can be delayed until the counter reaches zero to ensure that the result is available during execution. Prior art techniques implement scoreboarding automatically within the hardware. In other words, the software does not control operation of the scoreboarding hardware. However, such techniques may be expensive in terms of circuit complexity, layout footprint, and power consumption. A software-based approach to scoreboarding is described more fully below.

Figure 1:
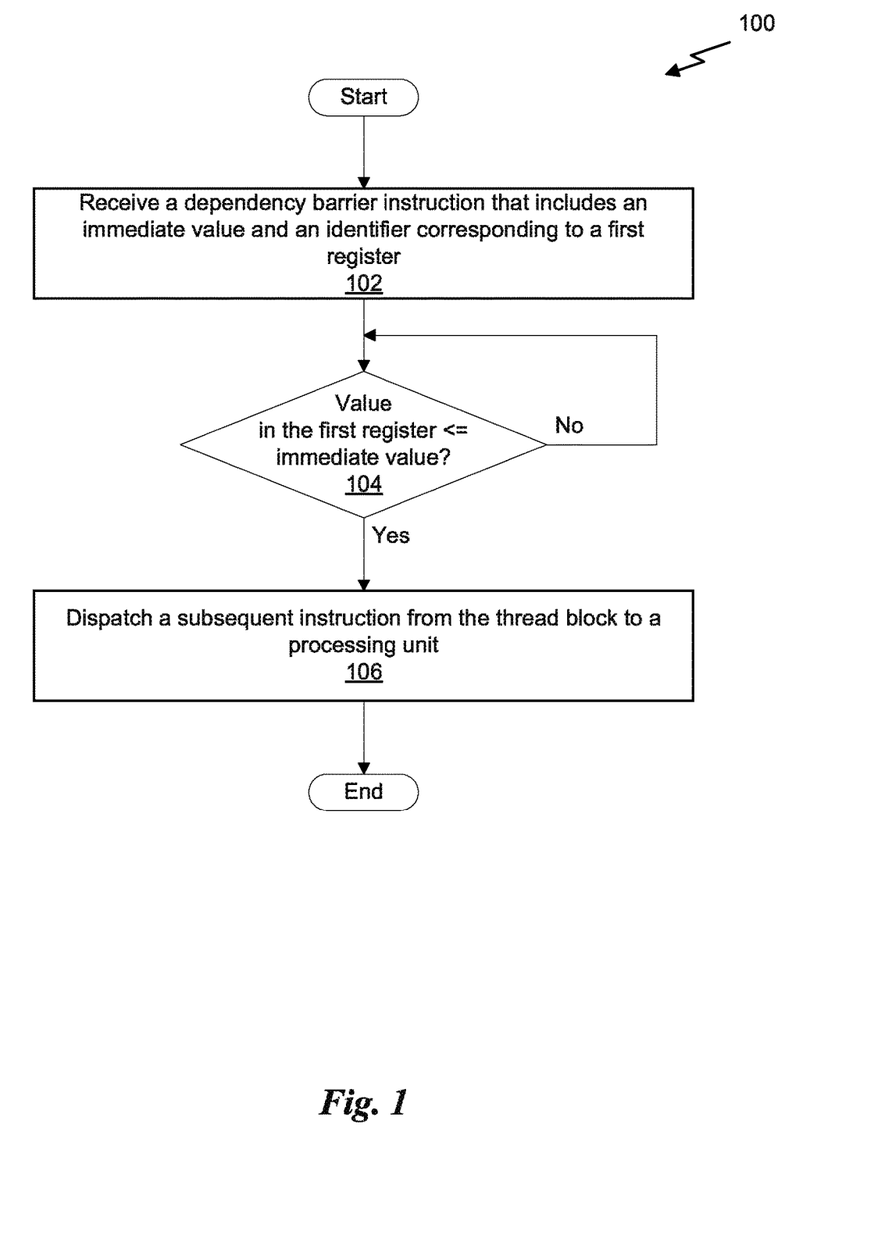
FIG. 1 illustrates a flowchart of a method for implementing a software-based scoreboarding mechanism, according to one embodiment.

FIG. 1 illustrates a flowchart of a method 100 for implementing a software-based scoreboarding mechanism, according to one embodiment. At step 102, a dependency barrier instruction is received. The dependency barrier instruction includes an immediate value and an identifier corresponding to a first register. In one embodiment, the first register may be a special scoreboard register of a plurality of scoreboard registers implemented by a scheduler unit. Each of the scoreboard registers may implement a counter (e.g., a 6-bit counter that stores a value between 0 and 63). At step 104, a value stored in the first register is compared to the immediate value. In one embodiment, the comparison comprises a test that determines whether the value in the first register is less than or equal to the immediate value. If the test fails, then the dispatch of a subsequent instruction in the thread is stalled by the scheduler unit. However, if the test passes, then the subsequent instruction may be dispatched to a processing unit. In another embodiment, the comparison may utilize an operator different than the less than or equal to operator to perform the comparison. For example, the test may pass only if the value in the first register is equal to the immediate value, only if the value in the first register is greater than the immediate value, and so forth. At step 106, the scheduler unit dispatches the subsequent instruction to at least a first processing unit of two or more processing units.

More illustrative information will now be set forth regarding various optional architectures and features with which the foregoing framework may or may not be implemented, per the desires of the user. It should be strongly noted that the following information is set forth for illustrative purposes and should not be construed as limiting in any manner.

Any of the following features may be optionally incorporated with or without the exclusion of other features described.

Figure 2:
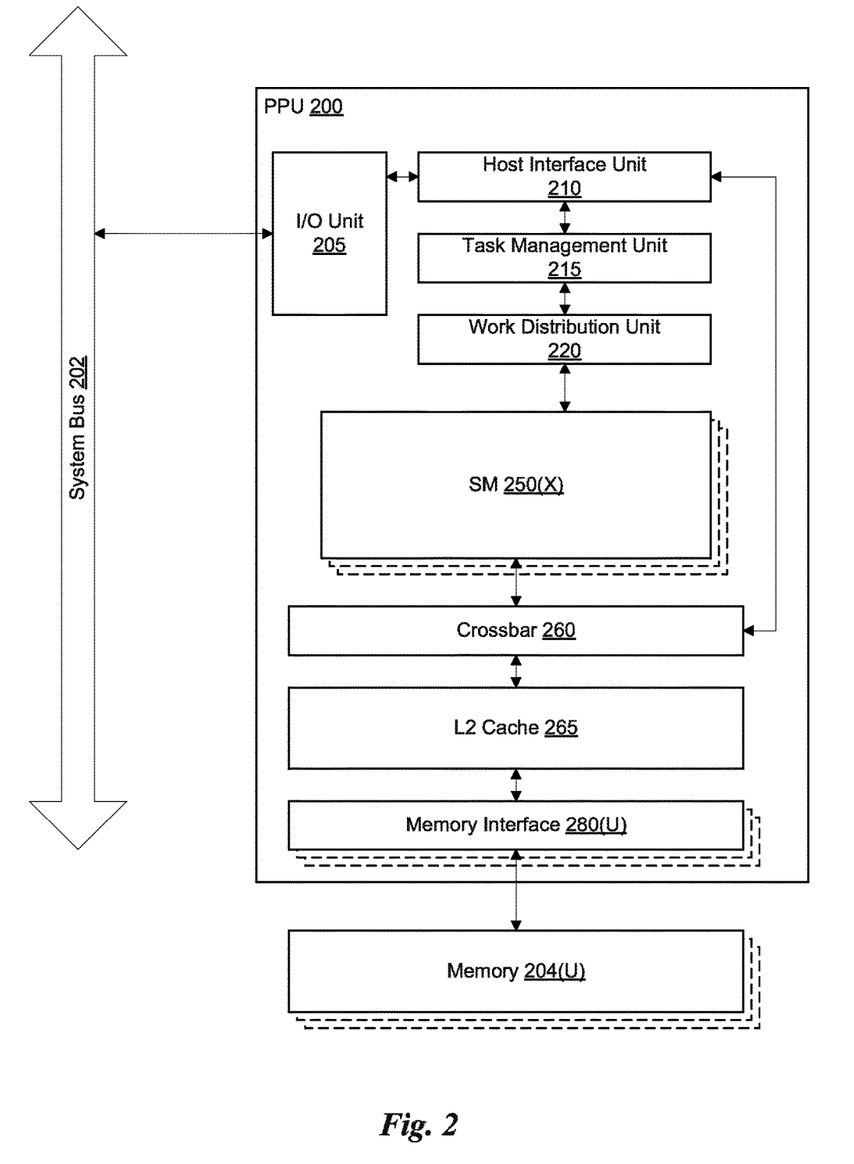
FIG. 2 illustrates a parallel processing unit (PPU), according to one embodiment.

FIG. 2 illustrates a parallel processing unit (PPU) 200, according to one embodiment. While a parallel processor is provided herein as an example of the PPU 200, it should be strongly noted that such processor is set forth for illustrative purposes only, and any processor may be employed to supplement and/or substitute for the same. In one embodiment, the PPU 200 is configured to execute a plurality of threads concurrently in two or more streaming multi-processors (SMs) 250. A thread (i.e., a thread of execution) is an instantiation of a set of instructions executing within a particular SM 250. Each SM 250, described below in more detail in conjunction with FIG. 3, may include, but is not limited to, one or more processing cores, one or more load/store units (LSUs), a level-one (L1) cache, shared memory, and the like.

In one embodiment, the PPU 200 includes an input/output (I/O) unit 205 configured to transmit and receive communications (i.e., commands, data, etc.) from a central processing unit (CPU) (not shown) over the system bus 202. The I/O unit 205 may implement a Peripheral Component Interconnect Express (PCIe) interface for communications over a PCIe bus. In alternative embodiments, the I/O unit 205 may implement other types of well-known bus interfaces.

The PPU 200 also includes a host interface unit 210 that decodes the commands and transmits the commands to the task management unit 215 or other units of the PPU 200 (e.g., memory interface 280) as the commands may specify. The host interface unit 210 is configured to route communications between and among the various logical units of the PPU 200.

In one embodiment, a program encoded as a command stream is written to a buffer by the CPU. The buffer is a region in memory, e.g., memory 204 or system memory, that is accessible (i.e., read/write) by both the CPU and the PPU 200. The CPU writes the command stream to the buffer and then transmits a pointer to the start of the command stream to the PPU 200. The host interface unit 210 provides the task management unit (TMU) 215 with pointers to one or more streams. The TMU 215 selects one or more streams and is configured to organize the selected streams as a pool of pending grids. The pool of pending grids may include new grids that have not yet been selected for execution and grids that have been partially executed and have been suspended.

A work distribution unit 220 that is coupled between the TMU 215 and the SMs 250 manages a pool of active grids, selecting and dispatching active grids for execution by the SMs 250. Pending grids are transferred to the active grid pool by the TMU 215 when a pending grid is eligible to execute, i.e., has no unresolved data dependencies. An active grid is transferred to the pending pool when execution of the active grid is blocked by a dependency. When execution of a grid is completed, the grid is removed from the active grid pool by the work distribution unit 220. In addition to receiving grids from the host interface unit 210 and the work distribution unit 220, the TMU 215 also receives grids that are dynamically generated by the SMs 250 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 200. An application may include instructions (i.e., API calls) that cause the driver kernel to generate one or more grids for execution. In one embodiment, the PPU 200 implements a SIMD (Single-Instruction, Multiple-Data) architecture where each thread block (i.e., warp) in a grid is concurrently executed on a different data set by different threads in the thread block. The driver kernel defines thread blocks that are comprised of k related threads, such that threads in the same thread block may exchange data through shared memory. In one embodiment, a thread block comprises 32 related threads and a grid is an array of one or more thread blocks that execute the same stream and the different thread blocks may exchange data through global memory.

In one embodiment, the PPU 200 comprises X SMs 250(X). For example, the PPU 200 may include 15 distinct SMs 250. Each SM 250 is multi-threaded and configured to execute a plurality of threads (e.g., 32 threads) from a particular thread block concurrently. Each of the SMs 250 is connected to a level-two (L2) cache 265 via a crossbar 260 (or other type of interconnect network). The L2 cache 265 is connected to one or more memory interfaces 280. Memory interfaces 280 implement 16, 32, 64, 128-bit data buses, or the like, for high-speed data transfer. In one embodiment, the PPU 200 comprises U memory interfaces 280(U), where each memory interface 280(U) is connected to a corresponding memory device 204(U). For example, PPU 200 may be connected to up to 6 memory devices 204, such as graphics double-data-rate, version 5, synchronous dynamic random access memory (GDDR5 SDRAM).

In one embodiment, the PPU 200 implements a multi-level memory hierarchy. The memory 204 is located off-chip in SDRAM coupled to the PPU 200. Data from the memory 204 may be fetched and stored in the L2 cache 265, which is located on-chip and is shared between the various SMs 250. In one embodiment, each of the SMs 250 also implements an L1 cache. The L1 cache is private memory that is dedicated to a particular SM 250. Each of the L1 caches is coupled to the shared L2 cache 265. Data from the L2 cache 265 may be fetched and stored in each of the L1 caches for processing in the functional units of the SMs 250.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes) to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, hull shader, geometry shader, pixel shader, etc. For example, the TMU 215 may configure one or more SMs 250 to execute a vertex shader program that processes a number of vertices defined by the model data. In one embodiment, the TMU 215 may configure different SMs 250 to execute different shader programs concurrently. For example, a first subset of SMs 250 may be configured to execute a vertex shader program while a second subset of SMs 250 may be configured to execute a pixel shader program. The first subset of SMs 250 processes vertex data to produce processed vertex data and writes the processed vertex data to the L2 cache 265 and/or the memory 204. After the processed vertex data is rasterized (i.e., transformed from three-dimensional data into two-dimensional data in screen space) to produce fragment data, the second subset of SMs 250 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 3:
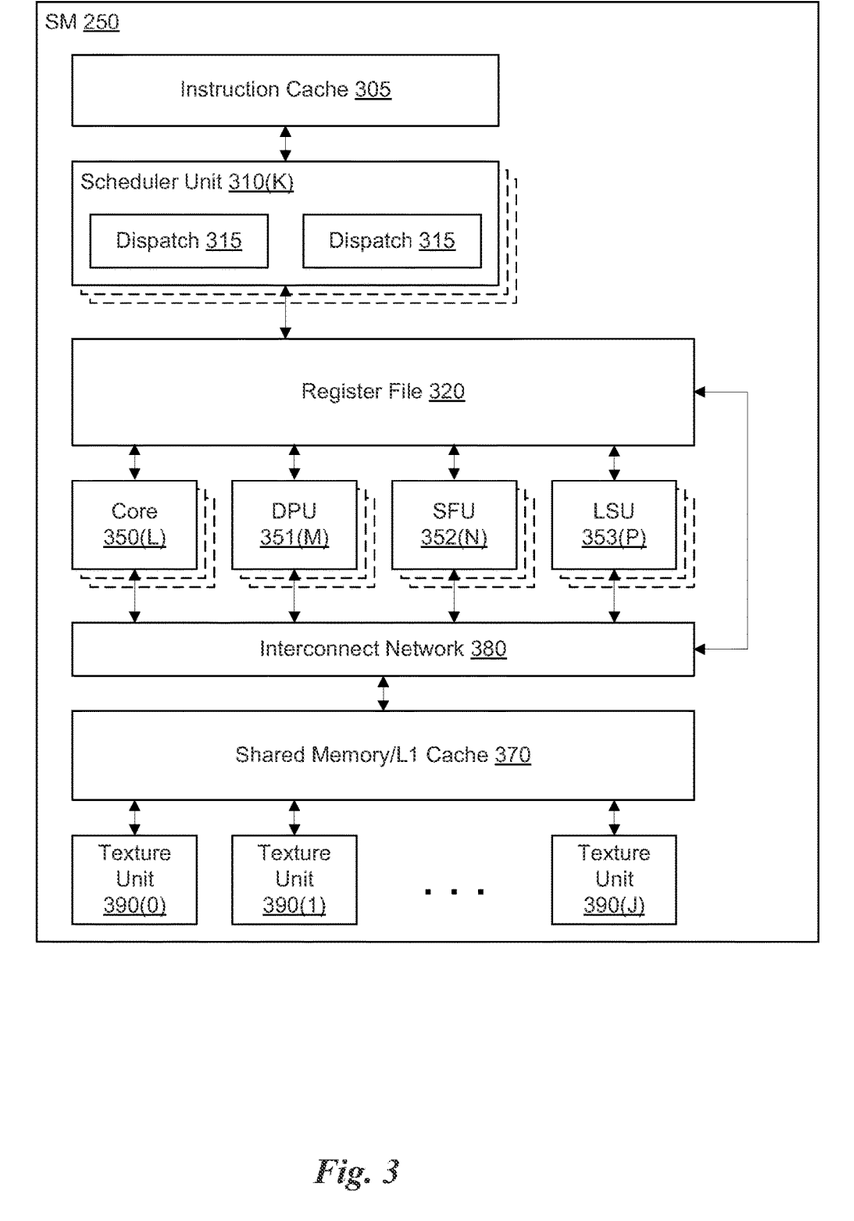
FIG. 3 illustrates the streaming multi-processor of FIG. 2, according to one embodiment.

FIG. 3 illustrates the streaming multi-processor 250 of FIG. 2, according to one embodiment. As shown in FIG. 3, the SM 250 includes an instruction cache 305, one or more scheduler units 310, a register file 320, one or more processing cores 350, one or more double precision units (DPUs) 351, one or more special function units (SFUs) 352, one or more load/store units (LSUs) 353, an interconnect network 380, a shared memory/L1 cache 370, and one or more texture units 390.

As described above, the work distribution unit 220 dispatches active grids for execution on one or more SMs 250 of the PPU 200. The scheduler unit 310 receives the grids from the work distribution unit 220 and manages instruction scheduling for one or more thread blocks of each active grid. The scheduler unit 310 schedules threads for execution in groups of parallel threads, where each group is called a warp. In one embodiment, each warp includes 32 threads. The scheduler unit 310 may manage a plurality of different thread blocks, allocating the thread blocks to warps for execution and then scheduling instructions from the plurality of different warps on the various functional units (i.e., cores 350, DPUs 351, SFUs 352, and LSUs 353) during each clock cycle.

In one embodiment, each scheduler unit 310 includes one or more instruction dispatch units 315. Each dispatch unit 315 is configured to transmit instructions to one or more of the functional units. In the embodiment shown in FIG. 3, the scheduler unit 310 includes two dispatch units 315 that enable two different instructions from the same warp to be dispatched during each clock cycle. In alternative embodiments, each scheduler unit 310 may include a single dispatch unit 315 or additional dispatch units 315.

Each SM 250 includes a register file 320 that provides a set of registers for the functional units of the SM 250. In one embodiment, the register file 320 is divided between each of the functional units such that each functional unit is allocated a dedicated portion of the register file 320. In another embodiment, the register file 320 is divided between the different warps being executed by the SM 250. The register file 320 provides temporary storage for operands connected to the data paths of the functional units.

Each SM 250 comprises L processing cores 350. In one embodiment, the SM 250 includes a large number (e.g., 192, etc.) of distinct processing cores 350. Each core 350 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 250 also comprises M DPUs 351 that implement double-precision floating point arithmetic, N SFUs 352 that perform special functions (e.g., copy rectangle, pixel blending operations, and the like), and P LSUs 353 that implement load and store operations between the shared memory/L1 cache 370 and the register file 320. In one embodiment, the SM 250 includes 64 DPUs 351, 32 SFUs 352, and 32 LSUs 353.

Each SM 250 includes an interconnect network 380 that connects each of the functional units to the register file 320 and the shared memory/L1 cache 370. In one embodiment, the interconnect network 380 is a crossbar that can be configured to connect any of the functional units to any of the registers in the register file 320 or the memory locations in shared memory/L1 cache 370.

In one embodiment, the SM 250 is implemented within a GPU. In such an embodiment, the SM 250 comprises J texture units 390. The texture units 390 are configured to load texture maps (i.e., a 2D array of texels) from the memory 204 and sample the texture maps to produce sampled texture values for use in shader programs. The texture units 390 implement texture operations such as anti-aliasing operations using mip-maps (i.e., texture maps of varying levels of detail). In one embodiment, the SM 250 includes 16 texture units 390.

The PPU 200 described above may be configured to perform highly parallel computations much faster than conventional CPUs. Parallel computing has advantages in graphics processing, data compression, biometrics, stream processing algorithms, and the like.

Figure 4:
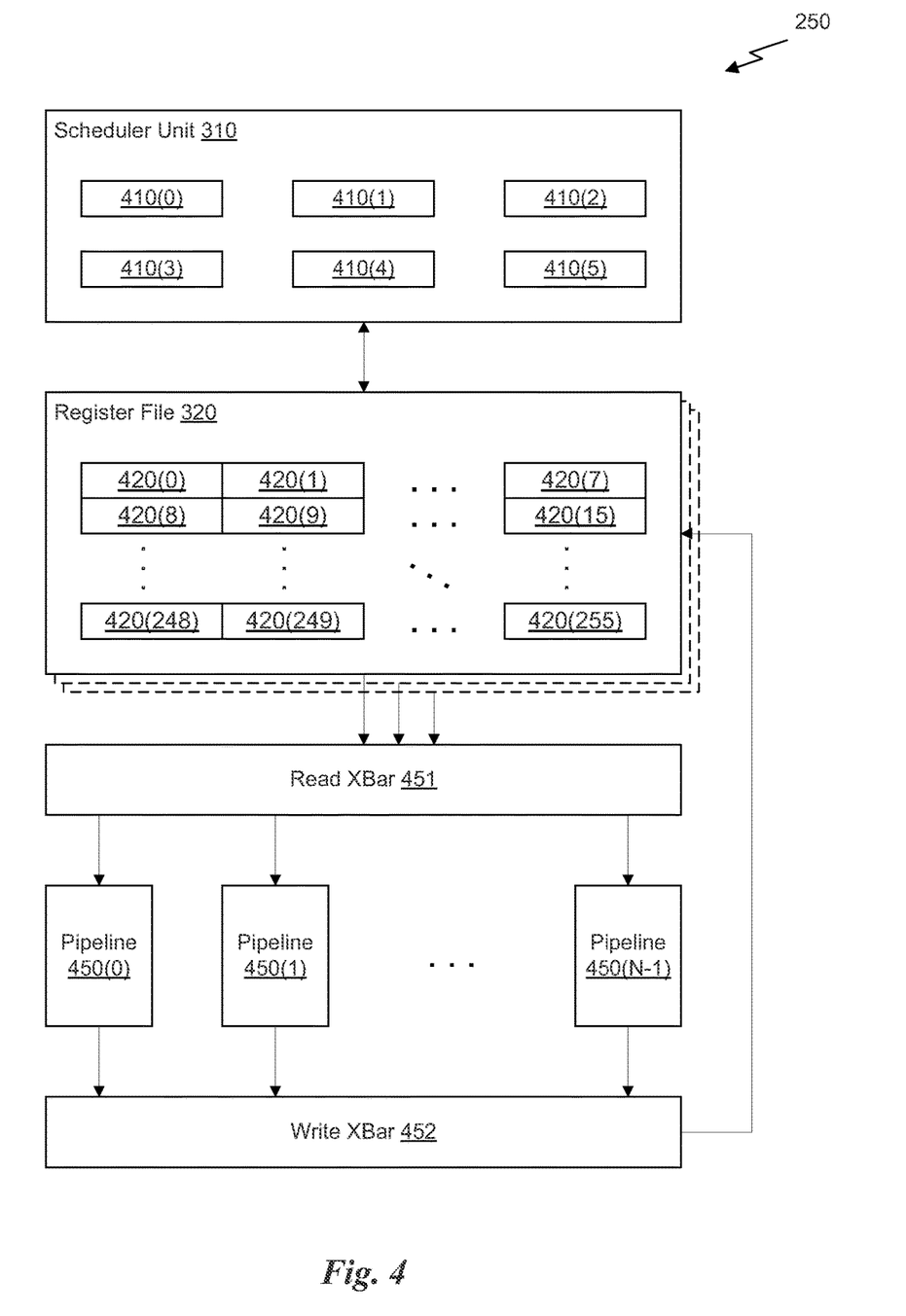
FIG. 4 illustrates an implementation of a scoreboarding mechanism, in accordance with one embodiment.

FIG. 4 illustrates an implementation of a scoreboarding mechanism, in accordance with one embodiment. As shown in FIG. 4, the SM 250 includes a scheduler unit 310 that implements a number of scoreboard registers 410. Each scoreboard register 410 includes a plurality of bits that encode a value (e.g., an unsigned integer). In one embodiment, a scoreboard register 410 includes 6 bits for encoding a value between 0 and 63. In other embodiments, the scoreboard register 410 may include any number of bits. In addition, the register file 320 may be divided into a number of lanes, each lane including a plurality of registers 420 allocated to a particular thread executed by the SM 250. In one embodiment, each thread is allocated 256 registers 420. For example, for a particular warp, the register file 320 may include 8096 registers allocated to 32 threads that are executed in parallel.

As also shown in FIG. 4, each SM 250 includes a number N of pipelined execution units 450. The pipelined execution units 450 may include the cores 350, the DPUs 351, the SFU 352, or the LSUs 353 as well as any other type of execution unit, coupled or decoupled. In the context of the present disclosure, a decoupled pipeline is any execution unit that can execute instructions out-of-order, thereby exhibiting a behavior where a result of an instruction dispatched to the execution pipeline will be written to the destination register an unknown number of clock cycles after the instruction has been dispatched by the scheduler unit 310. In contrast, a coupled pipeline is any execution unit that executes instructions in-order, thereby exhibiting a behavior where a result of an instruction dispatched to the execution pipeline will be written to the destination register a known number of clock cycles after the instruction has been dispatched by the scheduler unit 310. In one embodiment, a decoupled pipeline may include a FIFO that temporarily stores dispatched instructions for a number of clock cycles until the corresponding pipelined execution unit 450 is available to execute the instructions. The pipelined execution units 450 are coupled to a read crossbar 451 and a write crossbar 452, which are part of the interconnect network 380. Although not shown explicitly, each of the pipelined execution units 450 may be coupled to a plurality of collectors for storing operands as input to the datapath for the pipelined execution unit 450.

In one embodiment, a scoreboard register 410 may be utilized to ensure register dependencies are managed properly by the scheduling unit 310. A particular scoreboard register 410 may be utilized for a particular type of instruction. For example, a scoreboard register 410 may be utilized for each texture instruction of a thread. Each time a texture instruction is dispatched to a texture unit 390, the scoreboard register 410 is incremented. Once the texture unit 390 has written a value for the texture operation to a destination register (i.e., one of the registers 420) specified by the instruction, the scoreboard register 410 is decremented. For any subsequent instructions that have a dependency on the destination register, the scheduler unit 310 is configured to not dispatch the subsequent instruction until the corresponding scoreboard register 410 stores a value of zero (0). However, the scoreboarding mechanism described above is expensive in terms of power and die area. For example, a scoreboard register 410 may be required for each different type of pipelined execution unit 450.

It will be appreciated that, as described herein, scoreboard registers 410 are incremented when an instruction is dispatched and decremented when an operation is completed (i.e., either reading a value from a source operand or writing a value to a destination register). Then, the scoreboard registers 410 are checked to make sure the value of the scoreboard registers 410 are equal to zero. In another embodiment, the scoreboard registers 410 are decremented when an instruction is dispatched and incremented when an operation is completed (i.e., either reading a value from a source operand or writing a value to a destination register). In such an embodiment, the scoreboard registers 410 may be checked to make sure the value of the scoreboard registers 410 are equal to a value other than zero, such as a maximum value of the scoreboard register 410. It will be appreciated that the particular implementation does not depend on whether the scoreboard registers have a nominal value of zero, sixty-three, or some other value as long as the scoreboard registers are either incremented and decremented in a specific manner and the scoreboard registers 410 are checked to determine whether they contain a value equal to the nominal value.

In another embodiment, a limited number of scoreboard registers 410 may be defined that are generalized to be used by different types of pipelined execution units 450 (i.e., a particular scoreboard register 410 is not implemented per set of related pipelined execution units 450). A compiler (not explicitly shown) is configured to select which scoreboard register 410 to associate with a particular instruction that is to be dispatched to a decoupled pipeline (e.g., a texture unit 390, an LSU 353, etc.). Thus, the compiler is configured to demarcate dependency arcs in the program using the plurality of scoreboard registers 410; the older instruction generates a particular scoreboard and a newer instruction consumes the particular scoreboard.

For each instruction included in a program (e.g., a shader), the compiler may specify a scoreboard register (e.g., register 410(1)) in the plurality of scoreboard registers 410 to associate with the instruction. In other words, when the scheduler unit 310 schedules an instruction, the scheduler unit 310 increments the scoreboard register 410 associated with the destination register of the instruction. When the pipelined execution unit 450 has finished executing the instruction, and written an output value to the destination register, the scheduler unit 310 decrements the scoreboard register 410 associated with the destination register of the instruction. In one embodiment, the instruction includes a write dependency bit mask (e.g., 6 bits) that indicates which scoreboard register 410 is associated with the destination register of the instruction. The number of bits in the write dependency bit mask may reflect the number of scoreboard registers 410 implemented for a particular warp. A particular scoreboard register 410 may be specified by the compiler by setting a single bit (i.e., logical TRUE) of the write dependency bit mask for the instruction. Although the embodiment described above only allows for a single scoreboard register 410 associated with the destination register to be specified for a given instruction, some embodiments may enable multiple scoreboard registers 410 to be associated with one or more destination registers. For example, multiple bits in the write dependency bit mask may be used to specify multiple scoreboard registers 410.

The scheduler unit 310 checks the scoreboard register(s) 410 for any subsequent instruction that depends on the value in the destination register of the instruction. If the scoreboard registers 410 do not store a value of zero when checked by the scheduler unit 310, then the scheduler unit 310 delays the dispatch of the subsequent instruction until the specified scoreboard registers 410 store a value of zero. In another embodiment, logic external to the scheduler unit 310 may increment and/or decrement the particular scoreboard register(s) 410 specified by an instruction.

In addition to specifying one or more scoreboard registers 410 associated with the destination register(s) for an instruction, the compiler may also specify one or more scoreboard register(s) 410 that are associated with the source operands of the instruction. The instruction may include a second, read dependency bit mask that specifies which of the scoreboard registers 410 are associated with the one or more source operands. The scoreboard registers 410 associated with the source operands may be different from the scoreboard register(s) 410 associated with the destination register for the instruction. In one embodiment, a single scoreboard register 410 is associated with each of the one or more source operands for an instruction. The scoreboard registers 410 associated with the source operands may be incremented by the scheduler unit 310 when the instruction is dispatched to a decoupled pipeline and decremented by the scheduler unit 310 when the source operands for the instruction are read from the register file 320. In another embodiment, logic external to the scheduler unit 310 may increment and/or decrement the scoreboard registers 410.

In another embodiment, each of the instructions may encode an index of the scoreboard registers 410 associated with either the destination register or the one or more source operands using a different number of bits. For example, unlike a bit mask where each bit of the bit mask corresponds to a particular scoreboard register 410, the instruction may encode an index of the scoreboard register 410 associated with the destination register or the source operands in a smaller number of bits (e.g., 3 bits may be used to encode an index of 0-7 corresponding to eight or fewer scoreboard registers 410). In such embodiments, a special index (e.g., 0b111) may be used to indicate no scoreboard register is specified. This type of encoding is possible because, in one embodiment, only a single scoreboard register 410 can be associated with a destination register or the one or more source operands at a time.

It will be appreciated that the scoreboard register 410 associated with the destination register for an instruction protects from a RAW (Read-After-Write), also known as a dependency, or a WAW (Write-After-Write) hazard. In a RAW, a dependent, subsequent instruction attempts to read a source operand from a destination register of a previous instruction. In a WAW, two instructions may be associated with the same destination register and the order that the instructions write to the destination register may be switched when compared with the order of the instructions in the program. When the first instruction is dispatched by the scheduler unit 310, the scoreboard register 410 associated with the destination register of the first instruction is incremented. The scheduler unit 310 then prevents the subsequent instruction from being dispatched until the previously issued instruction has completed execution and a result is available in the destination register. These types of hazards exist because the latency of the decoupled pipelines is not known relative to when the instruction is dispatched by the scheduler unit 310.

It will be appreciated that the scoreboard register(s) 410 associated with the source operands for an instruction protects from a WAR (Write-After-Read) hazard (also known as an anti-dependency), where a dependent, subsequent instruction attempts to write to a destination register specified as a source operand for an instruction before the pipelined execution unit 450 executing the instruction has read the value in the destination register for one of the source operands. When the first instruction is dispatched by the scheduler unit 310, the scoreboard registers 410 associated with the source operands of the first instruction are incremented. The scheduler unit 310 then prevents the subsequent instruction from being dispatched until the pipelined execution unit 450 has read the values from the source operands. These types of hazards exist because the decoupled pipelines may not read the source operands for an instruction in the same clock cycle that the instruction is dispatched by the scheduler unit 310.

As described above, the write dependency bit mask and the read dependency bit mask are defined in the instruction for producing scoreboards when the instruction is dispatched. In other words, these bit masks are used to generate scoreboards and to manage dependencies of subsequently issued instructions. However, an instruction may also be a consumer of scoreboards. In one embodiment, an instruction includes an operand bit mask that is utilized to check one or more scoreboard registers 410 associated with the operands for an instruction, both the destination register operand (to protect against WAW hazards) and the one or more source operands (to protect against RAW hazards). Unlike the write dependency bit mask and the read dependency bit mask, which may only specify a single scoreboard, the operand bit mask may specify one or more scoreboards. Each of the scoreboards associated with the operand bit mask is checked by the scheduler unit 310 prior to the instruction being dispatched for execution. In another embodiment, multiple scoreboard registers may be specified using a list of scoreboard indices. For example, nine bits may be utilized to specify up to three different scoreboards using the indices between 0 and 7.

In one embodiment, the operand bit mask may include a plurality of bits; each bit corresponding to one of the scoreboard registers 410. For each operand, the compiler may set a bit corresponding to a scoreboard register 410 associated with the operand. It will be appreciated that two or more operands may be associated with the same scoreboard register 410. For example, the compiler may set the operand bit mask as 0b001101, which corresponds to scoreboard registers 410(0), 410(2), and 410(3). When the scheduler unit 310 selects an instruction from a particular warp to be dispatched, the scheduler unit checks each scoreboard register 410 corresponding to a set bit in the operand bit mask. In one embodiment, each of the checked scoreboard registers 410 should have a value of zero prior to the scheduler unit 310 dispatching the instruction to a pipelined execution unit 450. Thus, the operand bit mask enables the scheduler unit 310 to check if dependencies for the current instruction have been resolved by either the operands being read from or written to by a previously dispatched instruction.

In another embodiment, each of the instructions may specify a specific value of a scoreboard register 410 that enable an instruction to be dispatched by the scheduler unit 310. In other words, the scheduler unit 310 may not be configured to dispatch an instruction only when the scoreboard register 410 reaches a value of zero, but rather when the scoreboard register 410 reaches a value of one or two and so forth. The compiler may be able to take advantage of the partial ordering of instructions within decoupled pipelines. Even though the decoupled pipelines execute instructions out-of-order, each instruction executed by a particular decoupled pipeline is executed in-order with respect to the other instructions dispatched to the decoupled pipeline. In other words, partial ordering can be exploited by knowing that certain events associated with a program are guaranteed to occur in order.

For example, a program may include three texture operations. Because each of the texture operations are issued to the same decoupled pipeline (i.e., a texture unit 390), the texture operations are going to be executed in-order with respect to the other texture operations. As such, the compiler knows that the source operands for a first texture operation will be read prior to the source operands for a second texture operation, which are read prior to the source operands for a third texture operation, and so forth. Similarly, the compiler knows that the result for the first texture operation will be written to a destination register prior to the result for the second texture operation being written to a destination register, which is written prior to the result for the third texture operation being written to a destination register, and so forth. There is no guarantee in ordering however between when the result of one texture operation is written to a destination register and when the source operands for a subsequently dispatched texture operation are read from the register file 320.

The characteristics of such partial ordering may be exploited by the compiler to reduce the number of scoreboard registers 410 that need to be produced and consumed. As discussed above, when an instruction depends on two previously issued instructions from the same decoupled pipeline, only the last of those previously issued instructions needs to generate a scoreboard in order to ensure that both of the instructions have completed execution. The one or more other previously issued instructions are implied to have completed execution because the decoupled pipeline executes all instructions received by the decoupled pipeline in-order.

In addition, the compiler may specify that a particular scoreboard must only have a value less than or equal to some number before a particular instruction is dispatched by the scheduler unit 310. While a set of instructions may utilize a single scoreboard to track dependencies between instructions, some instructions in the set of instructions may be dispatched to a particular decoupled pipeline, thereby ensuring that once a scoreboard stores a value below some threshold value, then at least one of the instructions in the set of instructions has completed execution. The source operands bit mask (i.e., '&req=n') is interpreted to require that the specified scoreboard registers 410 have a value of zero before the instruction may be dispatched. However, in some cases, an instruction is only dependent on one or more instructions in the set of instructions that are associated with a particular scoreboard register 410, and the dependencies may have been resolved even when the scoreboard register 410 stores a value greater than zero. An example of a program utilizing this concept is shown in more detail below in FIG. 5.

Figure 5:
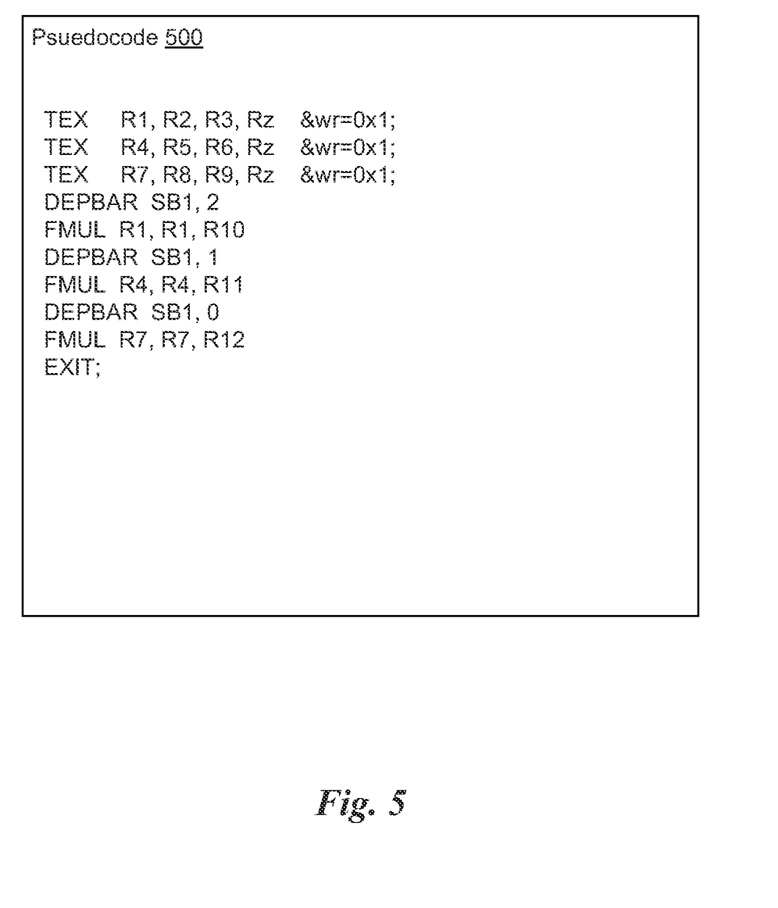
FIG. 5 illustrates pseudocode produced by a compiler, in accordance with one embodiment.

FIG. 5 illustrates pseudocode 500 produced by a compiler, the pseudocode 500 including instructions that implement an explicit software-based scoreboarding mechanism, in accordance with one embodiment. As shown in FIG. 5, pseudocode 500 includes a plurality of instructions including three texture instructions (i.e., TEX), three floating-point multiply instructions (i.e., FMUL), and three dependency barrier instructions (i.e., DEPBAR). The first texture instruction takes two source operands, R2 and R3 (Rz is a special zero register holding a value of 0), and stores a value in a first destination register, R1. The second texture instruction takes two source operands, R5 and R6, and stores a value in a second destination register, R4. The third texture instruction takes two source operands, R8 and R9, and stores a value in a third destination register, R7. The three texture instructions are dispatched to a decoupled pipeline (i.e., a texture unit 390) and will be executed in-order with respect to each of the texture instructions. In addition, each of the texture instructions includes an instruction suffix ('&wr=0x1') that causes a write dependency scoreboard to be produced when the texture instructions are dispatched. In other words, after each of the three texture instructions are dispatched to the texture units 390, the scheduler unit 310 increments a first scoreboard register 410(1) by one. Thus, after all three texture instructions have been dispatched to the texture units 390, the first scoreboard register 410(1) may contain a maximum value of three.

In contrast with including a source operands bit mask in subsequent dependent instructions, which would require the associated scoreboards to each contain a value of zero before the dependent instruction can be dispatched, a dependency barrier instruction (i.e., DEPBAR) may be included in the code that stalls the program until one or more scoreboard registers 410 have a value that is less than an immediate value included as an operand to the dependency barrier instruction. The dependency barrier instruction can exploit the partial ordering of instructions transmitted to a particular decoupled pipeline in order to manage dependencies with a reduced number of scoreboard registers 410 while also not unnecessarily slowing down the execution of the program.

As shown in FIG. 5, the first dependency barrier instruction is included after the three texture instructions and requires that the first scoreboard register 410(1) (e.g., SB1) have a value that is less than or equal to two. The first dependency barrier instruction is ordered before the first floating-point multiply instruction, which depends on the source operand stored in R1 that is written as a result of the execution of the first texture operation. At the time that the scheduler unit 310 decodes the first dependency barrier instruction, each of the three texture instructions will have been dispatched to the texture units 390. Thus, the first scoreboard register 410(1) will have been incremented three times. During the intervening time, zero or more of the texture operations may have been executed by the texture units 390, thus causing the first scoreboard register 410(1) to be decremented. If the first scoreboard register 410(1) holds a value of two, then the scheduler unit 310 knows that the first texture instruction has been executed and the output value was written to the destination register R1. Thus, the first floating-point multiply instruction can be dispatched to the floating-point multiplication unit because all dependencies for that instruction have been resolved. Using the dependency barrier instruction enables some dependent instructions to be dispatched prior to completion of all of the texture operations associated with the first scoreboard register 410(1).

The pseudocode 500 further includes a second DEPBAR instruction that requires the first scoreboard register 410(1) to be less than or equal to 1 followed by a second FMUL instruction that utilizes a source operand register R4 that was written as a destination register of the second texture instruction. The pseudocode 500 also includes a third DEPBAR instruction that requires the first scoreboard register 410(1) to be equal to zero followed by a third FMUL instruction that utilizes a source operand register R7 that was written as a destination register of the third texture instruction. It will be appreciated that the third DEPBAR instruction is equivalent to utilizing a source operands bit mask identifying the first scoreboard register 410(1) in the third FMUL instruction because the DEPBAR instruction includes an immediate value of 0, which is the same value that will be checked against using the '&req=0x1' instruction suffix. It will be appreciated that, in other exemplary programs, multiple DEPBAR instructions may by associated with multiple scoreboard registers and, potentially, multiple different and distinct decoupled pipelines.

Figure 6A:
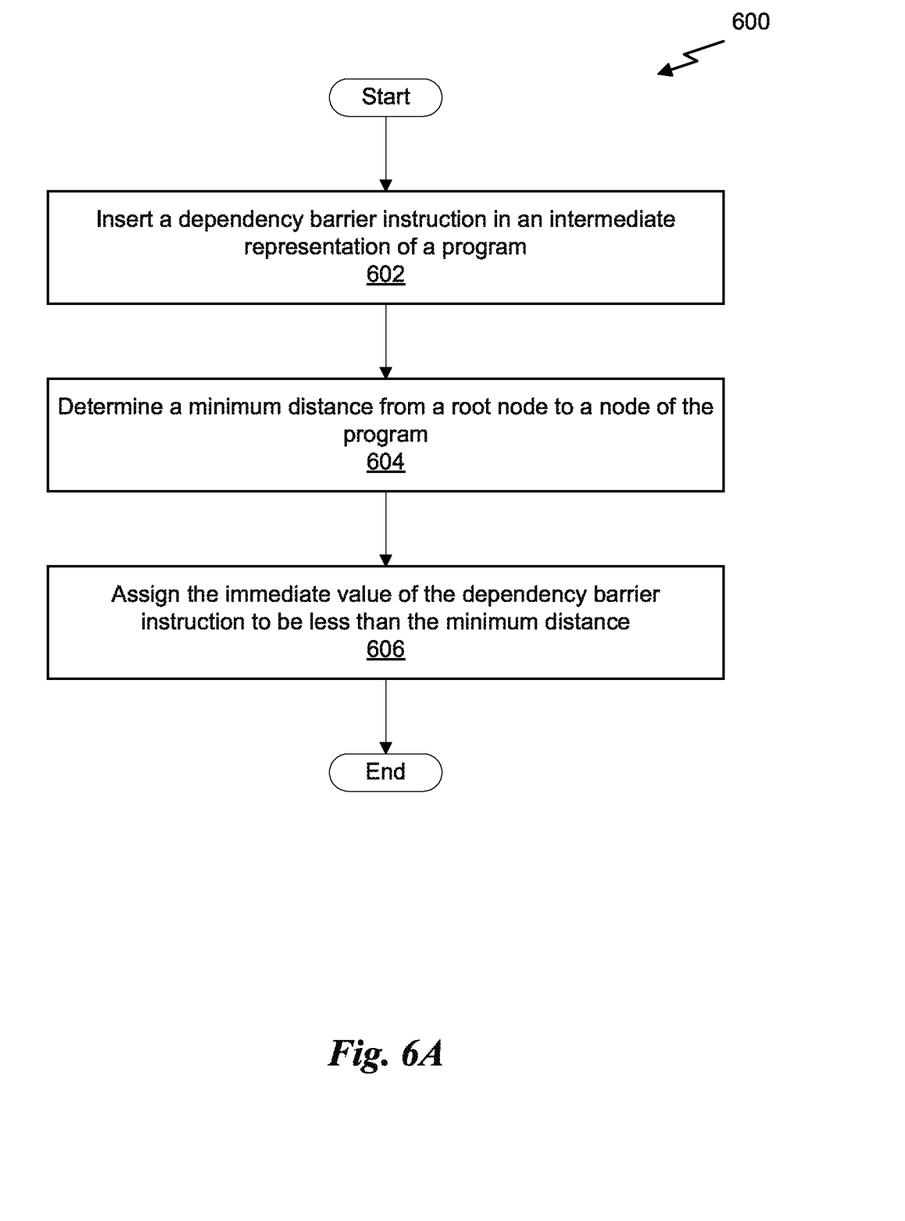
FIG. 6A illustrates a flowchart of a method for determining an immediate value for a dependency barrier instruction, according to one embodiment.

FIG. 6A illustrates a flowchart of a method 600 for determining an immediate value for a dependency barrier instruction, according to one embodiment. A compiler may be configured to insert dependency barrier instructions within the intermediate representation of code for a thread block. The dependency barrier instructions may include an immediate value and an identifier for a scoreboard register 410. Again, in one embodiment, the identifier may be, e.g., a bit mask that specifies a particular scoreboard register 410 that is associated with the dependency barrier instruction. At step 602, a compiler inserts a dependency barrier instruction in a program immediately preceding an instruction that is dependent on a previously issued instruction in the program. The previously issued instruction may be an instruction that is configured to be executed by a decoupled pipeline, such as a texture instruction or a load/store instruction. The previously issued instruction includes an instruction suffix that causes a scoreboard to be produced when the previously issued instruction is dispatched. The dependency barrier instruction should be associated with the same scoreboard register 410 as the previously issued instruction.

At step 604, the compiler determines a minimum distance from a root node (i.e., the dependency barrier instruction) to a node of the program (i.e., the previously issued instruction). The distance is computed based on the number of scoreboards that are produced and consumed for a particular decoupled pipeline. One technique for computing the minimum distance of a node is described below in conjunction with FIG. 6B. At step 606, the compiler assigns the immediate value to be less than the minimum distance.

Determining the immediate value for a dependency barrier instruction is simple if the referenced scoreboard register 410 is only associated with instructions dispatched to a single decoupled pipeline (i.e., a virtual queue) and the referenced scoreboard is only utilized for write dependencies or read dependencies, but not both. In this case, the immediate value is simply determined by counting the number of scoreboards generated between the root node and the node associated with the dependent read or the dependent write. However, the general case becomes more complicated when instructions associated with the same scoreboard register 410 may be dispatched to multiple decoupled pipelines (meaning the instructions associated with a single scoreboard register 410 may be executed out-of-order).

In one embodiment, a dependency barrier instruction should not be utilized in the cases where a single scoreboard is associated with multiple decoupled pipelines. However, a dependency barrier instruction can include a non-zero immediate value and also be associated with a scoreboard register 410 used for multiple decoupled pipelines when the minimum distance for the node in the first decoupled pipeline is greater than the immediate value and the total depth of any other decoupled pipeline associated with the scoreboard register 410 is less than the position of the node in the first decoupled pipeline.

Further, determining the minimum distance becomes more complicated when read dependencies and write dependencies are combined using the same scoreboard register 410. In such cases, the compiler may construct a directed graph that represents all possible paths the hardware can take when processing the instructions, and producing and consuming scoreboards, and look for all operations that are common to those paths based on a particular immediate value. Such operations having a distance greater than the immediate value in all possible paths are considered completed and all other operations are potentially outstanding.

Take two cases, a fully pipelined case where every read for the series of operations is completed and then every write for the series of operations is completed subsequent to all of the reads, and a non-pipelined case where a read followed by a write is completed for each operation in the series of operations, in-order. In the case of a write dependency, the minimum distance to a node will be given by the fully-pipelined case where all nodes are read and then all nodes are written. Therefore, counting the number of write dependency scoreboards produced between the root node and a particular node will provide the maximum immediate value that can be assigned to the dependency barrier instruction to guarantee that an instructions destination register has been written. In the case of a read dependency, the minimum distance to a node will be the minimum of the distance in the fully-pipelined case and the non-pipelined case. For a read dependency in a fully-pipelined case, the distance from the root node to the node is given by summing a count of the write dependency scoreboards produced by a series of operations dispatched to a particular decoupled pipeline, including operations ordered before as well as after the particular node, added to a count of the read dependency scoreboards produced by a series of operations dispatched between the root node and the particular node. For a read dependency in a non-pipelined case, the distance from the root node to the node is given by summing all of the read dependency scoreboards and write dependency scoreboards produced by a series of operations dispatched between the root node and the particular node.

Figure 6B:
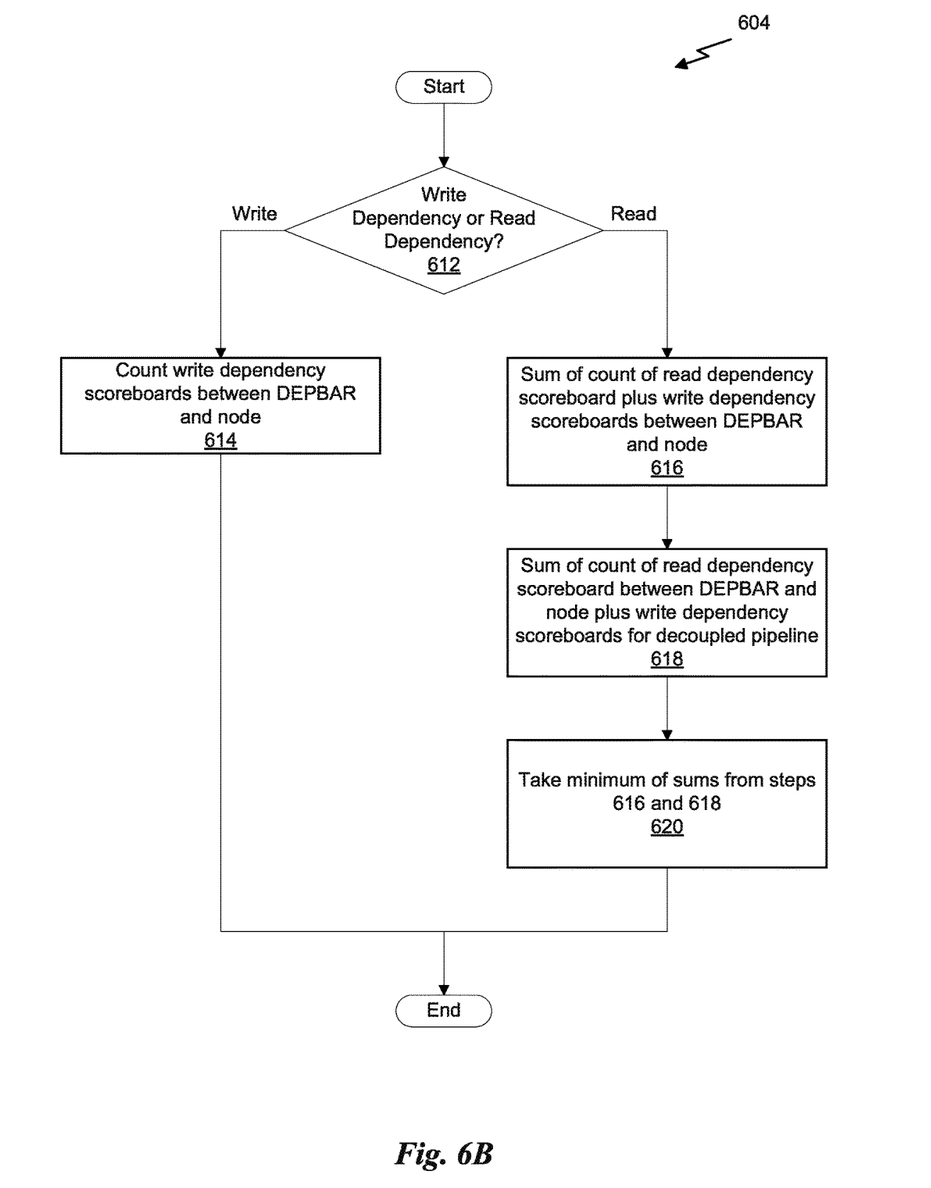
FIG. 6B illustrates a flowchart for determining a minimum distance from a root node to a node, according to one embodiment.

FIG. 6B illustrates a flowchart of step 604 of method 600 for determining a minimum distance from a root node to a node, according to one embodiment. At step 612, the compiler determines whether the dependency barrier instruction is protecting against a RAW hazard (i.e., a dependent write) or against a WAR hazard (i.e., a dependent read). If the dependency barrier instruction is protecting against a dependent write, then, at step 614, the compiler counts a number of write dependency scoreboards corresponding to a particular scoreboard register 410 between the dependency barrier instruction and the node. However, if, at step 612, the dependency barrier instruction is protecting against a dependent read, then the method proceeds to step 616.

At step 616, the compiler calculates a sum of a number of read dependency scoreboards corresponding to the particular scoreboard register 410 between the dependency barrier instruction and the node and a number of write dependency scoreboards corresponding to the particular scoreboard register 410 between the dependency barrier instruction and the node. At step 618, the compiler calculates a sum of a number of read dependency scoreboards corresponding to the particular scoreboard register 410 between the dependency barrier instruction and the node and a number of write dependency scoreboards corresponding to the particular scoreboard register 410 associated with a particular decoupled pipeline. At step 620, the compiler determines the minimum distance by taking the minimum of the sum from step 616 and the sum from step 618.

Figure 6C:
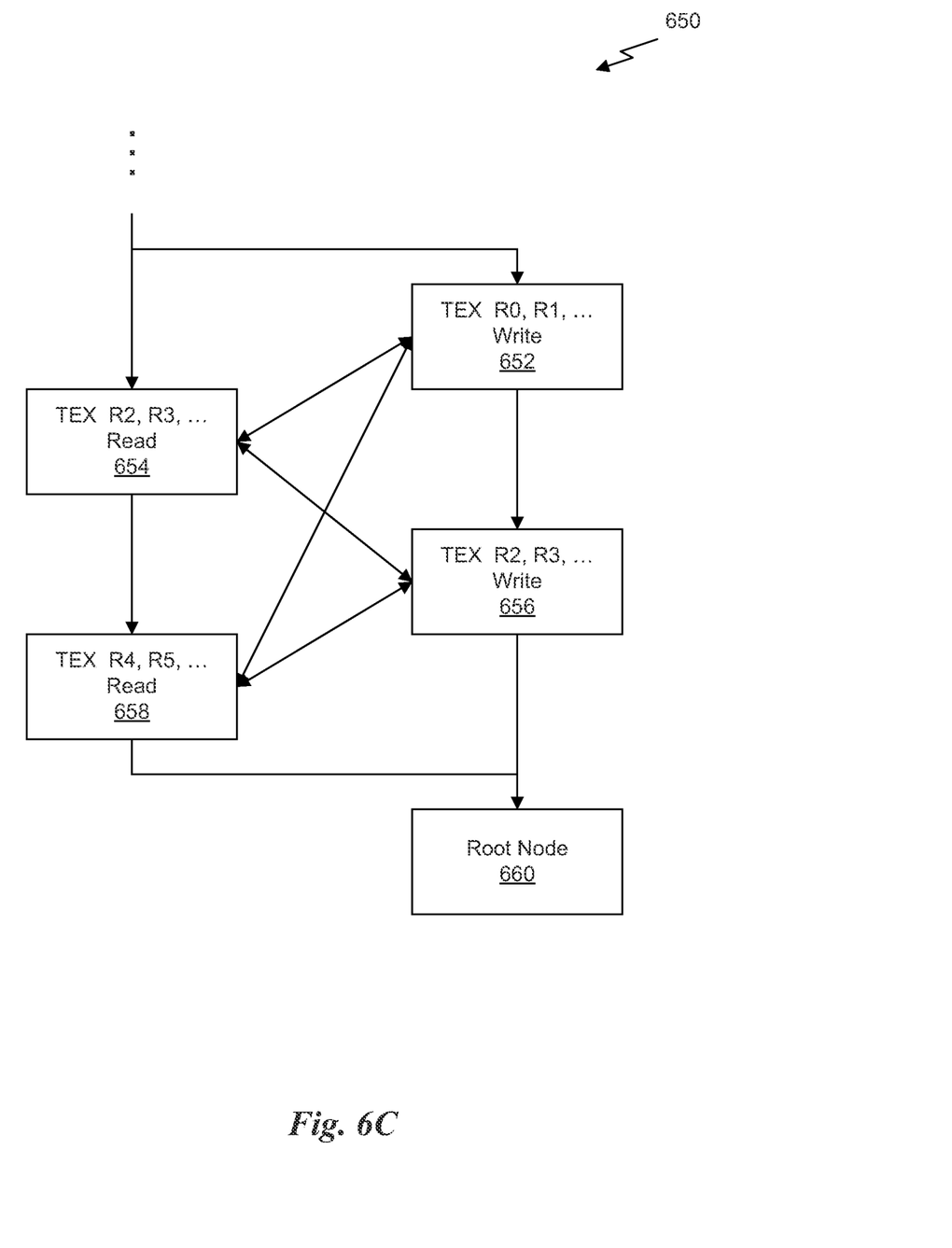
FIG. 6C illustrates a directed graph for a general example of code that includes the dependency barrier instruction, in accordance with one embodiment.

FIG. 6C illustrates a directed graph 650 for a general example of code that includes the dependency barrier instruction, in accordance with one embodiment. As shown, the directed graph 650 includes a plurality of nodes (e.g., 652, 654, etc.) that represent actions that cause a scoreboard register 410 to be decremented (i.e., either operands are read or destination registers are written). The directed graph 650 represents the following exemplary section of code:

TABLE 1

| TEX | R0, R1, ... | &wr=0x1; | |
|---|---|---|---|
| TEX | R2, R3, ... | &wr=0x1; | &rd=0x1; |
| TEX | R4, R5, ... | | &rd=0x1; |
| DEPBAR | SB1, 1; | | |

As shown in FIG. 6C, a first node 652 represents the write dependency scoreboard for the first texture operation, a second node 654 represents the read dependency scoreboard for the second texture operation, a third node 656 represents the write dependency scoreboard for the second texture operation, and a fourth node 658 represents the read dependency scoreboard for the third texture operation. The root node 660 represents the dependency barrier instruction. In the non-pipelined case, the order of the events follows node 652 to node 654 to node 656 to node 658 to the root node 660. In other words, the source operands for the first texture operation are read, then the destination register for the first texture operation is written (i.e., node 652), then the source operands for the second texture operation are read (i.e., node 654), then the destination register for the second texture operation is written (i.e., node 656), then the source operands for the third texture operation are read (i.e., node 658), and finally the destination register for the third texture operation is written. Conversely, in the fully-pipelined case, the order of the events follows node 654 to node 658 to node 652 to node 656 to the root node 660. In other words, the source operands for the first texture operation are read, then the source operands for the second texture operation are read (i.e., node 654), then the source operands for the third texture operation are read (i.e., node 658), then the destination register for the first texture operation is written (i.e., node 652), then the destination register for the second texture operation is written (i.e., node 656), and finally the destination register for the third texture operation is written.

In order to ensure that an operation has been completed is simply determined based on the minimum distance (in the two cases) between the root node and the node of interest. For example, the operations associated with node 658 and node 656 are only 1 step away from the root node 660, therefore, any immediate value greater than or equal to 1 does not ensure that either of these operations (i.e., the source operands for the third texture operation are read or the destination register for the second texture operation is written) have completed. In contrast, the minimum distance between the root node 660 and either nodes 654 or 652 is two, so a dependency barrier instruction having an immediate value of 1 ensures that the operations associated with these nodes will have completed.

It will be appreciated that the order of the operations represented by the directed graph 650 may be completed in any order represented by the arrows. In other words, all reads may be completed before any writes, or writes may be completed before each subsequent read, or some mixture of the two. In one embodiment, a compiler may be configured to generate a directed graph for a plurality of instructions preceding a dependency barrier instruction in order to determine a minimum distance between a root node 660 and a node of interest (i.e., a node associated with an operation that the dependency barrier instruction is inserted for in order to ensure that the operation has been completed).

Figure 7:
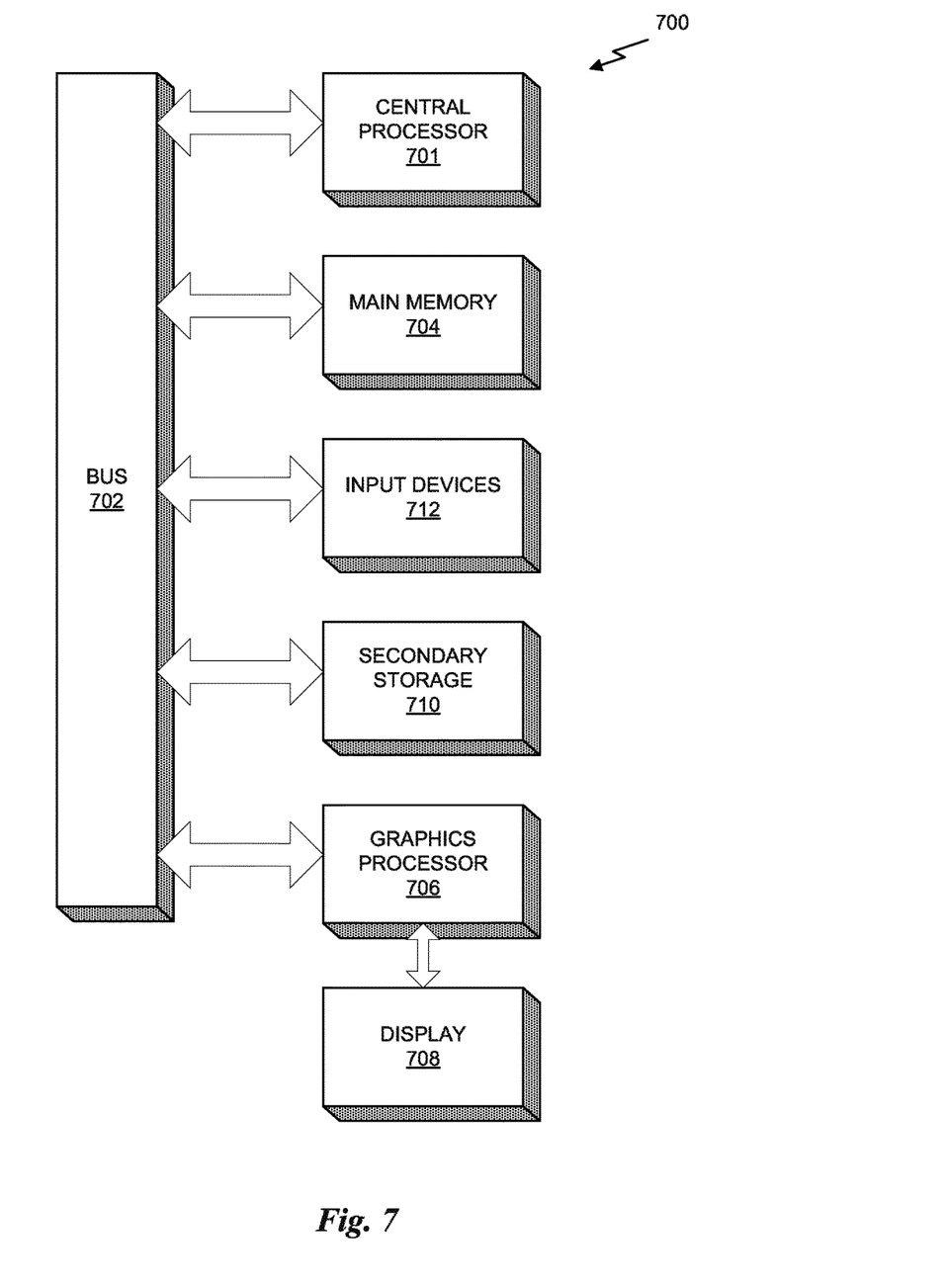
FIG. 7 illustrates an exemplary system in which the various architecture and/or functionality of the various previous embodiments may be implemented.

FIG. 7 illustrates an exemplary system 700 in which the various architecture and/or functionality of the various previous embodiments may be implemented. As shown, a system 700 is provided including at least one central processor 701 that is connected to a communication bus 702. The communication bus 702 may be implemented using any suitable protocol, such as PCI (Peripheral Component Interconnect), PCI-Express, AGP (Accelerated Graphics Port), HyperTransport, or any other bus or point-to-point communication protocol(s). The system 700 also includes a main memory 704. Control logic (software) and data are stored in the main memory 704 which may take the form of random access memory (RAM).

The system 700 also includes input devices 712, a graphics processor 706, and a display 708, i.e. a conventional CRT (cathode ray tube), LCD (liquid crystal display), LED (light emitting diode), plasma display or the like. User input may be received from the input devices 712, e.g., keyboard, mouse, touchpad, microphone, and the like. In one embodiment, the graphics processor 706 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 704 and/or the secondary storage 710. Such computer programs, when executed, enable the system 700 to perform various functions. The memory 704, the storage 710, and/or any other storage are possible examples of computer-readable media.

In one embodiment, the architecture and/or functionality of the various previous figures may be implemented in the context of the central processor 701, the graphics processor 706, an integrated circuit (not shown) that is capable of at least a portion of the capabilities of both the central processor 701 and the graphics processor 706, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, laptop computer, server, workstation, game consoles, embedded system, and/or any other type of logic. Still yet, the system 700 may take the form of various other devices including, but not limited to a personal digital assistant (PDA) device, a mobile phone device, a television, etc.

Further, while not shown, the system 700 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
receiving a dependency barrier instruction that includes an immediate value and an identifier corresponding to a first register; and based on a comparison of the immediate value to the value stored in the first register, dispatching a subsequent instruction to at least a first processing unit of two or more processing units, wherein a compiler is configured to determine the immediate value by:
for a particular dependency barrier instruction, determining a minimum distance from the dependency barrier instruction to a node, and
assigning the immediate value to be less than or equal to the minimum distance.

2. The method of claim 1, wherein the identifier comprises a bit mask, and each bit of the bit mask corresponds to a particular register in a plurality of registers.

3. The method of claim 1, wherein the identifier comprises an index corresponding to a particular register in a plurality of registers.

4. The method of claim 1, wherein the first register is included in a plurality of registers, and each register in the plurality of registers comprises a counter of N bits.

5. The method of claim 1, further comprising decrementing the value stored in the first register when a result is written to a destination register for an instruction that specified the identifier corresponding to the first register.

6. The method of claim 1, wherein the immediate value comprises an unsigned integer.

7. The method of claim 1, further comprising:
receiving an instruction that includes a second identifier that specifies the first register;
dispatching the instruction to either the first processing unit or a second processing unit; and
incrementing the value stored in the first register.

8. The method of claim 1, wherein the comparison comprises determining that the value stored in the first register is less than or equal to the immediate value.

9. The method of claim 1, wherein determining the minimum distance comprises:
if the node is associated with a dependent write, then counting a number of register writes associated with an identifier corresponding to the first register between the dependency barrier instruction and the node; or
if the node is associated with a dependent read, then taking the minimum of:
a number of register reads associated with an identifier corresponding to the first register between the dependency barrier instruction and the node summed with a number of register writes associated with the identifier corresponding to the first register between the dependency barrier instruction and the node, and
a number of register reads associated with the identifier corresponding to the first register between the dependency barrier instruction and the node summed with a number of register writes associated with the identifier corresponding to the first register.

10. A non-transitory computer-readable storage medium storing instructions that, when executed by a processor, cause the processor to perform steps comprising:
receiving a dependency barrier instruction that includes an immediate value and an identifier corresponding to a first register; and
based on a comparison of the immediate value to the value stored in the first register, dispatching a subsequent instruction to at least a first processing unit of two or more processing units,
wherein a compiler is configured to determine the immediate value by:
determining a minimum distance from the dependency barrier instruction to a node, and
assigning the immediate value to be less than or equal to the minimum distance.

11. The non-transitory computer-readable storage medium of claim 10, wherein the identifier comprises a bit mask.

12. The non-transitory computer-readable storage medium of claim 10, wherein the first register is included in a plurality of registers, and each register in the plurality of registers comprises a counter of N bits.

13. The non-transitory computer-readable storage medium of claim 10, wherein the comparison comprises determining that the value stored in the first register is less than or equal to the immediate value.

14. A system comprising:
two or more processing units; and
a scheduler unit coupled to the two or more processing units and configured to:
receive a dependency barrier instruction that includes an immediate value and an identifier corresponding to a first register, and
based on a comparison of the immediate value to the value stored in the first register, dispatch a subsequent instruction to at least a first processing unit of two or more processing units,
wherein a compiler is configured to determine the immediate value by:
determining a minimum distance from the dependency barrier instruction to a node, and
assigning the immediate value to be less than or equal to the minimum distance.

15. The system of claim 14, wherein the first register is included in a plurality of registers, and each register in the plurality of registers comprises a counter of N bits.

16. The system of claim 14, wherein the immediate value comprises an unsigned integer.

17. The system of claim 14, wherein the comparison comprises determining that the value stored in the first register is less than or equal to the immediate value.

18. The non-transitory computer-readable storage medium of claim 10, wherein determining the minimum distance comprises:
if the node is associated with a dependent write, then counting a number of register writes associated with an identifier corresponding to the first register between the dependency barrier instruction and the node; or
if the node is associated with a dependent read, then taking the minimum of:
a number of register reads associated with an identifier corresponding to the first register between the dependency barrier instruction and the node summed with a number of register writes associated with the identifier corresponding to the first register between the dependency barrier instruction and the node, and
a number of register reads associated with the identifier corresponding to the first register between the dependency barrier instruction and the node summed with a number of register writes associated with the identifier corresponding to the first register.

19. The system of claim 14, wherein determining the minimum distance comprises:
if the node is associated with a dependent write, then counting a number of register writes associated with an identifier corresponding to the first register between the dependency barrier instruction and the node; or if the node is associated with a dependent read, then taking the minimum of:
  a number of register reads associated with an identifier corresponding to the first register between the dependency barrier instruction and the node summed with a number of register writes associated with the identifier corresponding to the first register between the dependency barrier instruction and the node, and
  a number of register reads associated with the identifier corresponding to the first register between the dependency barrier instruction and the node summed with a number of register writes associated with the identifier corresponding to the first register.

* * * * *